(12) United States Patent
Nishimura

(10) Patent No.: US 9,442,348 B2
(45) Date of Patent: Sep. 13, 2016

(54) IMAGING DEVICE AND INTERCHANGEABLE LENS ARRANGED TO HAVE A REDUCED AMOUNT OF MAGNETIC FIELD REACHING AN IMAGE PICKUP ELEMENT

(71) Applicant: CANON KABUSHIKI KAISHA, Tokyo (JP)

(72) Inventor: Shinichi Nishimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/720,583

(22) Filed: May 22, 2015

(65) Prior Publication Data

US 2015/0350577 A1     Dec. 3, 2015

(30) Foreign Application Priority Data

May 27, 2014   (JP) ................. 2014-109036

(51) Int. Cl.
  *H04N 3/14*        (2006.01)
  *H04N 5/225*       (2006.01)
  *G03B 17/14*       (2006.01)

(52) U.S. Cl.
  CPC ............ *G03B 17/14* (2013.01); *H04N 5/2252* (2013.01)

(58) Field of Classification Search
  CPC .......... G03B 3/10; G03B 17/14; G02B 7/08; G02B 7/102; G02B 7/36; H04N 5/23212; H04N 1/1048; H04N 5/2254
  See application file for complete search history.

(56) References Cited

U.S. PATENT DOCUMENTS

| | | | | |
|---|---|---|---|---|
| 2009/0268309 A1* | 10/2009 | Ke | ............. | G02B 7/08 359/698 |
| 2011/0279899 A1* | 11/2011 | Motoike | ............. | G03B 5/00 359/557 |
| 2014/0078350 A1* | 3/2014 | Aoki | ............. | H04N 5/2254 348/241 |

FOREIGN PATENT DOCUMENTS

JP       2011-123432 A      6/2011

* cited by examiner

*Primary Examiner* — Sinh Tran
*Assistant Examiner* — Selam T Gebriel
(74) *Attorney, Agent, or Firm* — Canon U.S.A., Inc. IP Division

(57) ABSTRACT

A first magnetic body is arranged between a coil and an image pickup element, and has an opening through which light directed from an imaging optical system toward the image pickup element passes. A second magnetic body is arranged at a position on the coil side with respect to the first magnetic body in an optical axis direction of the imaging optical system. The second magnetic body is arranged such that at least a portion thereof overlaps the first magnetic body when seen in the optical axis direction, at a position on the coil side with respect to the opening. The second magnetic body is made of a ferromagnetic material having higher relative permeability than that of the first magnetic body, and has a smaller area than that of the first magnetic body when seen in the optical axis direction.

11 Claims, 9 Drawing Sheets

IMAGING DEVICE AND INTERCHANGEABLE LENS ARRANGED TO HAVE A REDUCED AMOUNT OF MAGNETIC FIELD REACHING AN IMAGE PICKUP ELEMENT

BACKGROUND OF THE INVENTION

1. Field of the Invention

The present disclosure relates to a technology of suppressing entering of leakage magnetic field noise, generated from a magnetic field generation source, into an image pickup element.

2. Description of the Related Art

Recently, an image pickup element mounted on an imaging device such as a digital camcorder or a digital still camera has higher ISO sensitivity. As such, a clearer image can be taken even in a scene of few light quantities such as night view. Along with improvements in sensitivity, however, an image pickup element is affected by weak noise which has not been a problem, whereby a problem of disturbance caused in an image is becoming apparent.

For example, in a digital single lens reflex camera, an interchangeable lens includes a coil provided inside a motor circuit for driving the lens. A slight amount of leakage magnetic flex generated from such a coil may affect the image pickup element to thereby cause disturbance of an image to be generated.

Conventionally, Japanese Patent Application Laid-open No. 2011-123432 proposes that in order to shield a magnetic field from a magnetic field generation source located around an image pickup element, part of the image pickup element is surrounded by a ferromagnetic substance having high relative permeability such as permalloy.

A plate member of a ferromagnetic substance having high relative permeability (such as permalloy, for example) exhibits a high magnetic field shielding effect if the surface area is large. However, it is expensive compared with stainless or steel sheet generally used for casings of electronic devices. As such, for inexpensive products, it is not allowable to use an effective, large ferromagnetic substance having high relative permeability. As such, it is desirable to have a configuration capable of effectively reducing the amount of a magnetic field reaching an image pickup element, even if the area of a ferromagnetic material having high relative permeability is small.

In view of the above, an object of the present technology is to reduce the amount of a magnetic field reaching an image pickup element even if the area (cubic content) of a magnetic body, made of a ferromagnetic material having high relative permeability, is small.

SUMMARY OF THE INVENTION

An imaging device of the present technology includes an imaging optical system; an image pickup element arranged opposite to the imaging optical system, and configured to perform photoelectric conversion on an optical image formed by the imaging optical system; a magnetic field generation source that generates a magnetic field when receiving an electric current supplied; an annular first magnetic body; and a second magnetic body. The first magnetic body is arranged between the magnetic field generation source and the image pickup element, and has an opening through which light directed from the imaging optical system toward the image pickup element passes. The second magnetic body is arranged at a position which is on the side of the magnetic field generation source with respect to the first magnetic body in an optical axis direction of the imaging optical system, and on the side of the magnetic field generation source with respect to the opening, while at least a portion thereof overlapping the first magnetic body when seen in the optical axis direction. The second magnetic body is made of a ferromagnetic material having higher relative permeability than that of the first magnetic body, and has a smaller area than that of the first magnetic body when seen in the optical axis direction.

Further features of the present invention will become apparent from the following description of exemplary embodiments (with reference to the attached drawings).

DESCRIPTION OF THE EMBODIMENTS (First Embodiment)

Figure 1:
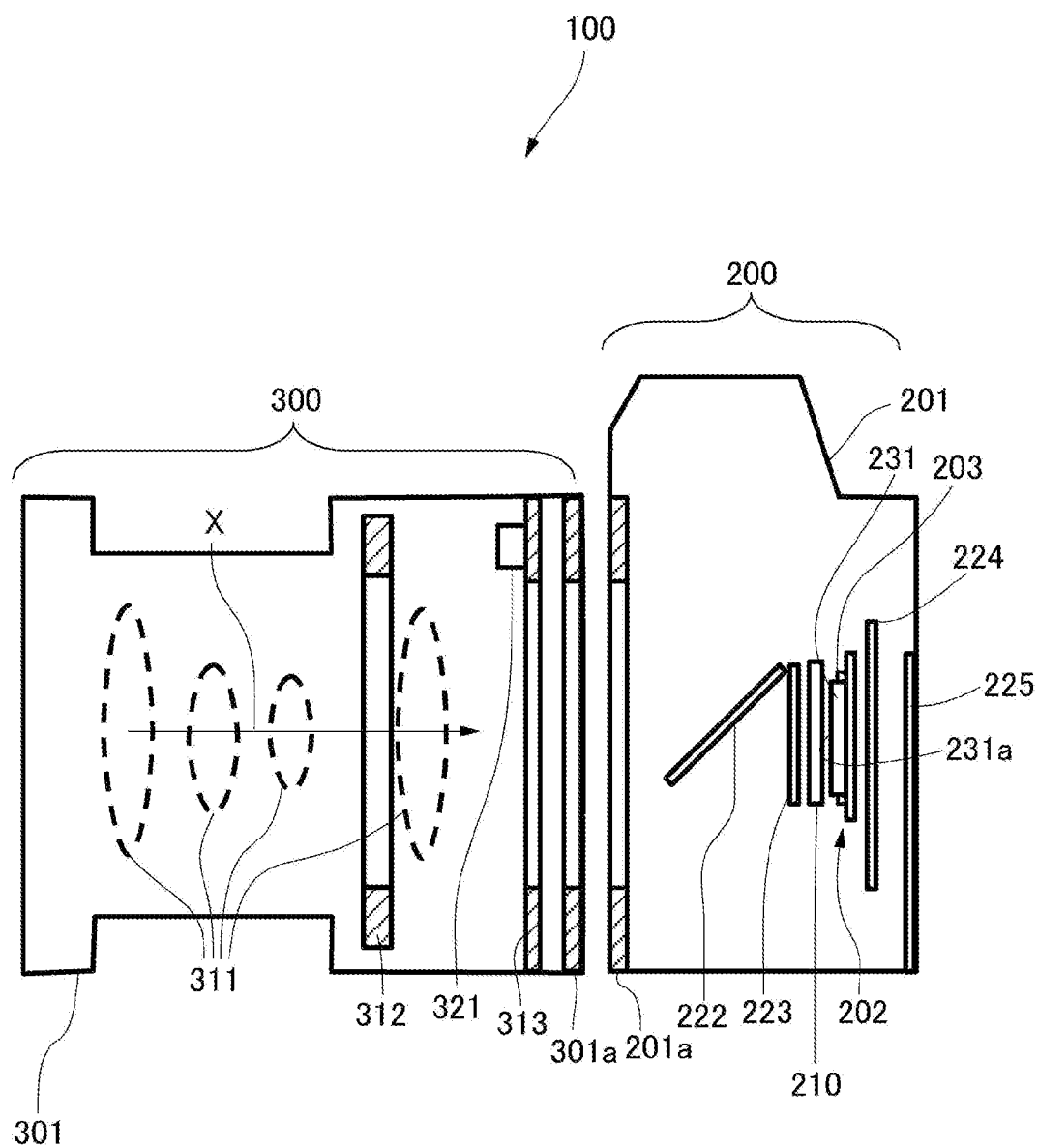
FIG. 1 is a diagram illustrating a schematic configuration of an imaging device according to a first embodiment of the present technology.

Hereinafter, an embodiment of the present technology will be described in detail with reference to the drawings. FIG. 1 is a diagram illustrating a schematic configuration of a camera as an imaging device according to a first embodiment of the present technology. A digital camera (camera) 100 as an imaging device is a digital single lens reflex camera, which includes a camera main body 200 that is a main body of the imaging device, and an interchangeable lens (lens barrel) 300 attachable to and detachable from the camera main body 200. In FIG. 1, the interchangeable lens 300 is attached to the camera main body 200. Hereinafter, description will be given on the assumption that the interchangeable lens 300 is attached to the camera main body 200.

The camera main body 200 includes a casing 201, and also includes a mirror 222, a shutter 223, an imaging unit 202, and an image processing circuit 224 which are disposed inside the casing 201. The camera main body 200 also includes a liquid crystal display 225 fixed to the casing 201 so as to be exposed outside from the casing 201. The imaging unit 202 includes an image pickup element 203 having a semiconductor unit (semiconductor chip) 231. The semiconductor unit 231 has a light receiving surface 231a.

The interchangeable lens 300 includes a casing 301 that is an interchangeable lens casing, and an imaging optical system 311 disposed inside the casing 301 and configured to form an optical image on the light receiving surface 231a of the image pickup element 203 when the casing 301 (interchangeable lens 300) is attached to the casing 201. The imaging optical system 311 is configured of a plurality of lenses.

The interchangeable lens 300 also includes an annular lens driving motor 312 arranged around the imaging optical system 311, and a drive circuit 313 for driving (operating) the lens driving motor 312. The drive circuit 313 includes a printed wiring board formed in an annular shape, and a boosting coil 321 mounted on the printed wiring board.

The casing 301 has a lens-side mount 301a having an opening formed therein, and the casing 201 has a camera-side mount 201a having an opening formed therein. By fitting the lens-side mount 301a and the camera-side mount 201a, the interchangeable lens 300 (casing 301) is attached to the camera main body 200 (casing 201).

An arrow X direction illustrated in FIG. 1 is an optical axis direction of the imaging optical system 311, which is vertical to the light receiving surface 231a of the image pickup element 203.

Light traveling in the arrow X direction from the imaging optical system 311 is guided into the casing 201 through an opening in the lens driving motor 312, an opening in the drive circuit 313, the opening in the lens-side mount 301a of the casing 301, and the opening in the camera-side mount 201a of the casing 201.

Inside the casing 201, the mirror 222, the shutter 223, and the like are provided along the arrow X direction in front side in the arrow X direction (the light receiving surface 231a side) of the imaging unit 202.

The image pickup element 203 is an image sensor (solid-state image sensor) such as a CMOS image sensor or a CCD image sensor which performs photoelectric conversion on an optical image formed by the imaging optical system 311. The image pickup element 203 is formed to have a quadrangle outer shape in a front view (seen from the arrow X direction vertical to the light receiving surface 231a of the image pickup element 203).

The image pickup element 203 is arranged inside the casing 201 such that when the interchangeable lens 300 is attached to the casing 201, the light receiving surface 231a faces the imaging optical system 311 via the mirror 222, the shutter 223, and the like.

The image pickup element 203 performs photoelectric conversion on an optical image formed on the light receiving surface 231a by the imaging optical system 311 when the interchangeable lens 300 is attached to the casing 201, and outputs an image signal to the image processing circuit 224. The image processing circuit 224 performs image processing on the obtained image data, and outputs it to the liquid crystal display 225, a memory (not illustrated), and the like.

The coil 321 is a magnetic field generation source which generates a magnetic field when an electric current is supplied, and is a source of magnetic field noise with respect to the image pickup element 203.

Figure 2A:
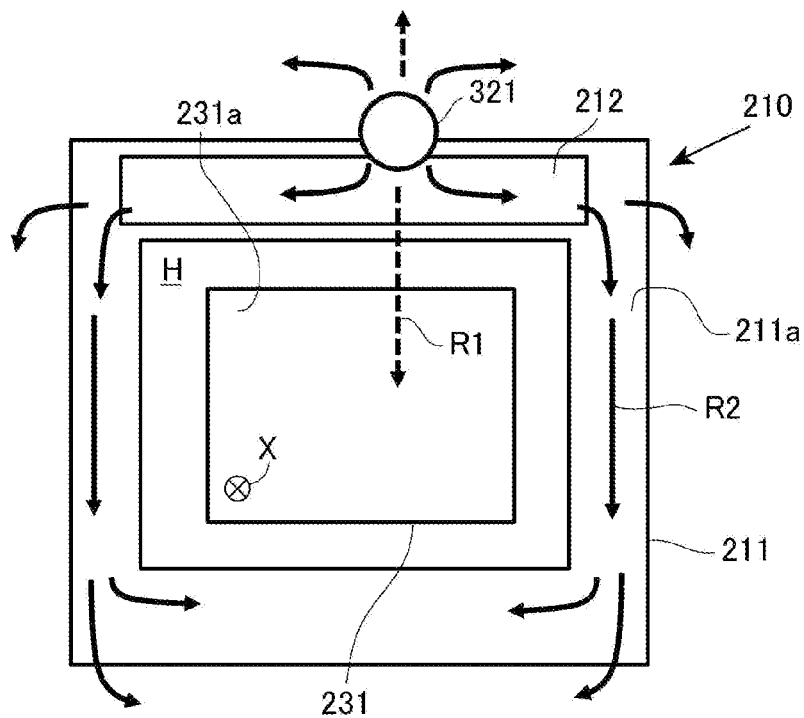
FIGS. 2A and 2B are diagrams illustrating details of main part of the imaging device according to the first embodiment of the present technology.
Figure 2B:
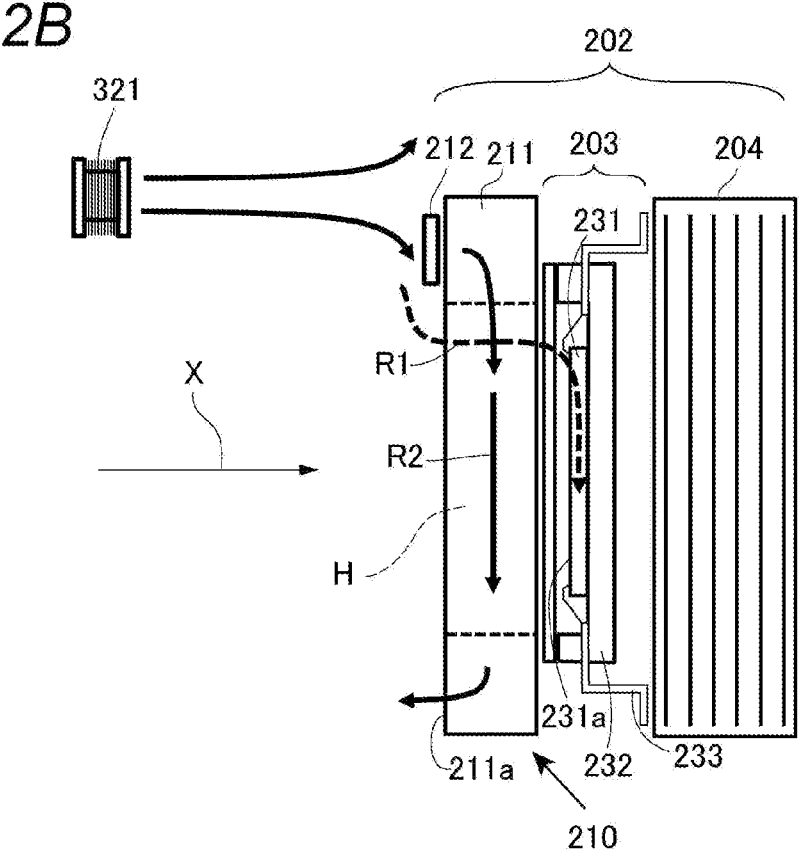

FIGS. 2A and 2B are diagrams illustrating the coil 321 and the imaging unit 202 which are main part of the camera 100. FIG. 2A is a front view of the coil 321 and the imaging unit 202 seen in the arrow X direction. FIG. 2B is a side view of the coil 321 and the imaging unit 202 seen in a direction orthogonal to the arrow X direction. The image pickup element 203 includes the semiconductor unit 231 and a package substrate 232 on which the semiconductor unit 231 is mounted, in which a plurality of terminals 233 is fixed on the package substrate 232 and are mounted on (joined by soldering to) the printed wiring board 204. The package substrate 232 is formed of a ceramic substrate, a resin substrate, a printed wiring board, or the like.

The imaging unit 202 includes a frame-like (annular) magnetic member 210 having an opening H disposed between the coil 321 that is a magnetic field generation source, and the image pickup element 203. The magnetic member 210 is arranged adjacent to the image pickup element 203. Specifically, as illustrated in FIG. 2B, a first magnetic body 211 is arranged adjacent to the image pickup element 203 on the side where the coil 321 is arranged with respect to the image pickup element 203, in the arrow X direction.

The magnetic member 210 includes the first magnetic body 211, and a second magnetic body 212 made of a ferromagnetic material of higher relative permeability than that of the first magnetic body 211 and having a smaller area than that of the first magnetic body 211 when seen in the optical axis direction of the imaging optical system. Further, a region where the second magnetic body is arranged includes a region nearest to the coil 321 that is a magnetic field generation source of the annular magnetic member 210.

The opening H is formed to have a size in which light travelling from the imaging optical system 311 to the light receiving surface 231a of the image pickup element 203 passes through. Specifically, the opening H is formed to have a larger area than that of the light receiving surface 231a when seen in the arrow X direction. Further, when seen in the arrow X direction, the opening H is formed to have a smaller area than that of the outer shape of the image pickup element 203 (the surface of the package substrate 232 on which the semiconductor unit 231 is mounted). The light receiving surface 231a is formed to be in a quadrangle shape when seen in the arrow X direction, and the opening H is also formed to be in a quadrangle shape when seen in the arrow X direction.

Further, the imaging unit 202 includes the second magnetic body 212 arranged at a position of the coil 321 side in the arrow X direction with respect to the first magnetic body 211. The first magnetic body 211 has a surface 211a of the side where the coil 321 is arranged in the arrow X direction, and the second magnetic body 212 is arranged adjacent to the surface 211a. In that case, it is preferable that the second magnetic body 212 is arranged with a slight gap with respect to the first magnetic body 211, or arranged to be in contact with the first magnetic body 211. While it is only necessary that the gap between the first magnetic body 211 and the second magnetic body 212 has magnetic coupling, it is preferable to bring the first magnetic body 211 and the second magnetic body 212 into contact with each other because the magnetic resistance is reduced.

Further, the first magnetic body 211 may be annular or have a structure in which a portion of the annular shape is cut off. In the case of a structure in which a portion of the annular shape is cut off, it is preferable that the first magnetic body 211 and the second magnetic body 212 are integrated, and that the shape of the integrated first magnetic body 211 and second magnetic body 212 is annular. Further, "annular" in this context may be toric, quadrangle annular, or other annular shapes.

As illustrated in FIG. 2A, the second magnetic body 212 is arranged at a position of the coil 321 side with respect to the opening H when seen in the arrow X direction, while at least a portion thereof (the whole in the present embodiment) overlapping the first magnetic body 211. Specifically, the second magnetic body 212 is arranged adjacent to one side, nearest to the coil 321, of the four sides of the opening H. This means that the second magnetic body 212 is arranged on the frame portion of an opening side nearest to the coil 321, on the surface 211a of the coil side of the first magnetic body 211.

The first magnetic body 211 and the second magnetic body 212 are made of a ferromagnetic material and formed in a plate shape or a film shape. The second magnetic body 212 is made of a ferromagnetic material having higher relative permeability than that of the first magnetic body 211. The second magnetic body 212 is formed to have a smaller area than that of the first magnetic body 211 when seen in the arrow X direction. Further, the second magnetic body 212 is formed to be thinner in the arrow X direction than the first magnetic body 211.

It is preferable that the first magnetic body 211 is formed of stainless SUS430 which is made of a material having lower relative permeability. As the first magnetic body 211 is not an expensive material having high relative permeability such as permalloy which is typically used as a magnetic body, it is possible to suppress an increase in the cost even if the first magnetic body 211 is used in a large area.

It should be noted that besides SUS430, as the first magnetic body 211, it is also possible to use SUS630, SPCC steel (cold rolled steel), or some galvanized steel such as Silver Top (registered trademark), which is a magnetic body having low relative permeability. Here, a magnetic body having low relative permeability means one having relative permeability of not less than 50 but not more than 1000, specifically. This can be preferably used as a material of the first magnetic body 211. This means that the first magnetic body 211 may be formed including at least one of SUS430, SUS630, SPCC steel, and some galvanized steel. In other words, the first magnetic body 211 may be configured of any one of SUS430, SUS630, SPCC steel, and some galvanized steel, or a combination of two or more of them. For example, the first magnetic body 211 may be configured of a combination of SUS430 and SUS630. However, as the first magnetic body 211, one having relative permeability of almost 1 which is not a so-called magnetic body, such as aluminum, copper, SUS304, or conductive plastic, is unable to be used.

On the other hand, the second magnetic body 212 is formed of a nanocrystal soft magnetic material such as Finemet (registered trademark) which is a ferromagnetic material having higher relative permeability than that of the first magnetic body 211. Besides, as the second magnetic body 212, it is also possible to use permalloy having high permeability, amorphous magnetic material, ferrite, electromagnetic steel, a noise suppression sheet having high permeability such as Busteraid (registered trademark)(containing magnetic powder, magnetic filler, or magnetic film), and the like. This means that it is only necessary that the second magnetic body 212 is formed by containing at least one of nanocrystal soft magnetic material, permalloy, amorphous magnetic material, ferrite, electromagnetic steel, and a noise suppression sheet having high permeability (containing magnetic powder, magnetic filler, or magnetic film). In other words, the second magnetic body 212 may be any one of nanocrystal soft magnetic material, permalloy, amorphous magnetic material, ferrite, electromagnetic steel, and a noise suppression sheet having high permeability, or a combination of two or more of them. The noise suppression sheet is one containing magnetic powder, magnetic filler, or magnetic film.

As the area of the second magnetic body 212, seen in the arrow X direction, is significantly smaller than that of the first magnetic body 211, it is possible to suppress an increase in the cost as a component.

Here, description will be added regarding relative permeability of SUS430 in a plate shape which constitutes the first magnetic body 211. The relative permeability of SUS430 was measured under a condition that initial permeability was calculated by applying a magnetic flux density of not more than 1 µT specified by JIS 2561C. However, JIS 2561C specifies to perform measurement using a ring-shaped measurement sample. As such, permeability of a plate-like magnetic body to be actually used is unable to be calculated accurately with such a measurement method. Accordingly, it is necessary to use a tool capable of measuring a plate-like sample.

Figure 3:
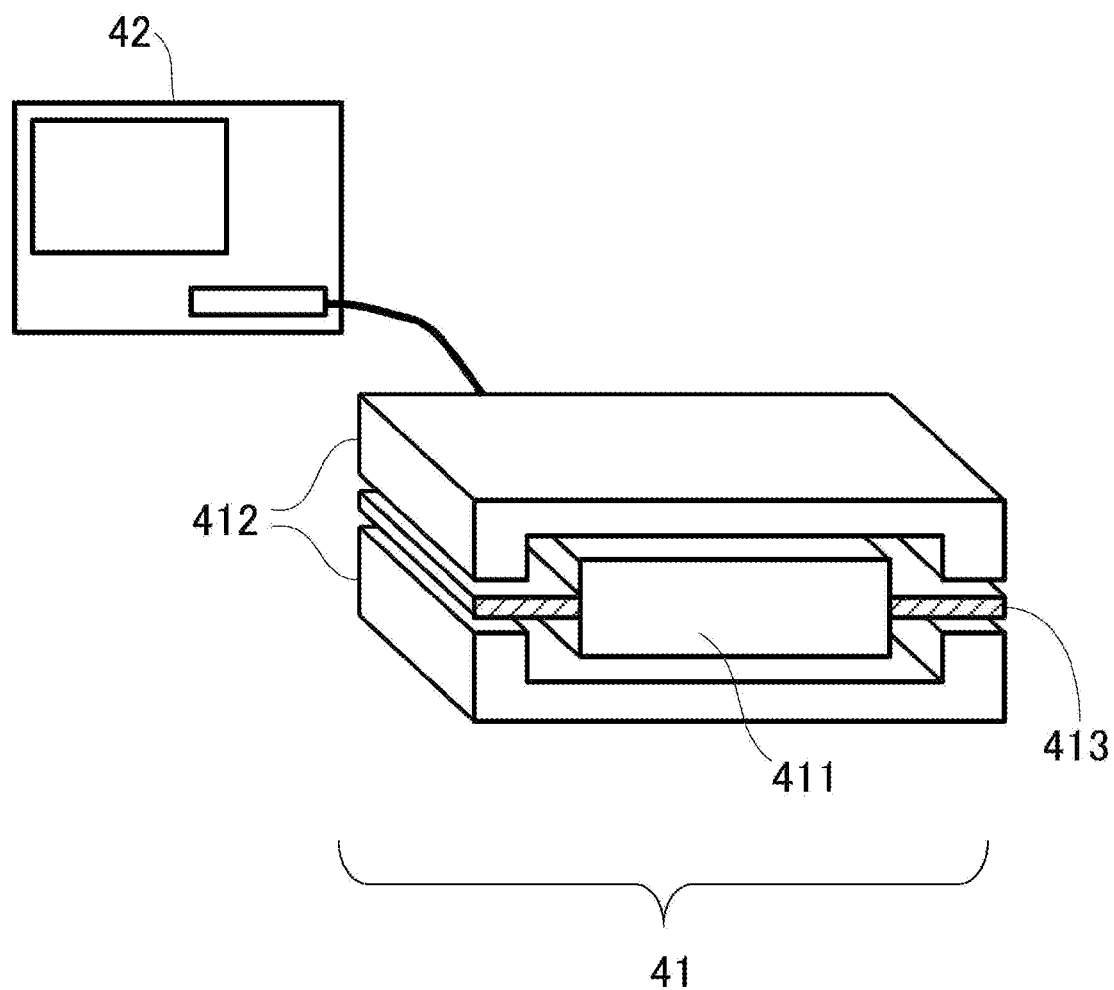
FIG. 3 is a diagram illustrating a measurement system for measuring relative permeability.

FIG. 3 is a diagram illustrating a measurement system for measuring relative permeability. A double yoke frame 41 (yokes 412 and a coil 411 surrounded by the yokes 412) illustrated in FIG. 3 is one used in "electromagnetic steel plate veneer magnetism testing method" of JIS C2556, and a measurement sample 413 formed in a plate shape is inserted in the frame. To the coil 411 of the double yoke frame 41, an LCR meter 42 (impedance analyzer is also acceptable) is connected to thereby obtain an inductance value. With reference to the inductance value of a state where the sample is not inserted, the real part µ' of permeability was calculated from the inductance value and the resistance value when the measurement sample 413 was inserted, using the following Expression (1).

Expression 1

$$\mu' = \frac{L(L_{\it eff} - L_w)}{\mu_0 N^2 A}.$$  Expression (1)

Here, N=the number of windings of the coil, vacuum permeability $\mu_0 = 4\pi \times 10^7$ (H/m), A=sectional area of measurement sample, L=length of measurement sample, $L_{\it eff}$=inductance measurement value obtained by LCR meter, and $L_w$=inductance measurement value when sample is not inserted.

Figure 4:
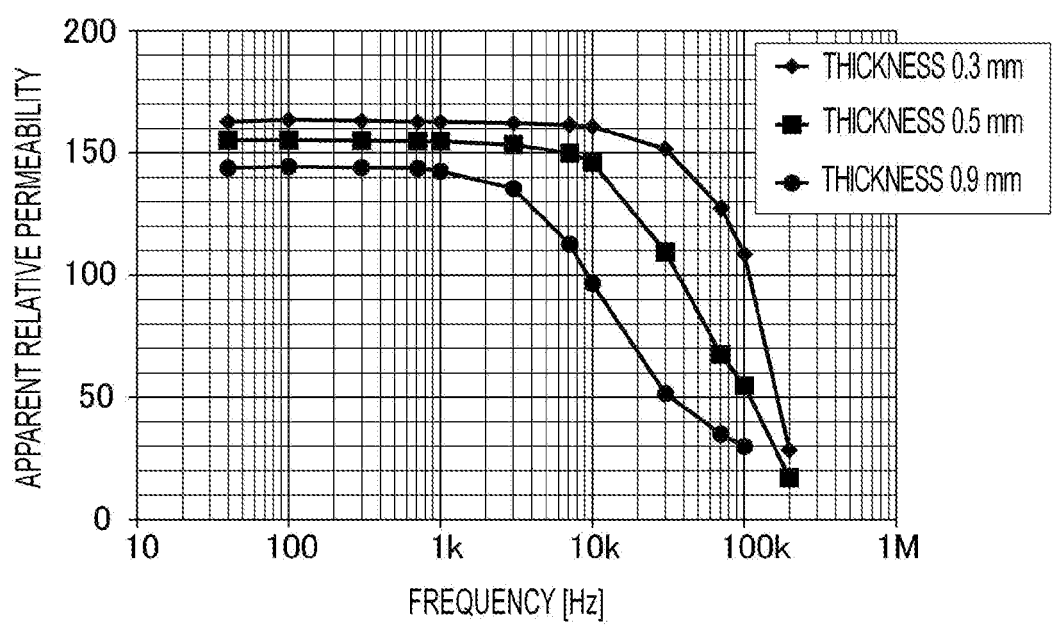
FIG. 4 is a graph illustrating relative permeability with respect to the frequency of SUS430.

FIG. 4 illustrates relative permeability of stainless SUS430 obtained by this method. FIG. 4 is a graph illustrating the relative permeability with respect to the frequency of SUS430. The horizontal axis shows the frequency and the vertical axis shows the relative permeability. In the case of low frequencies, relative permeability is almost 150 (no unit). In the case of high frequencies, as a magnetic field is less likely to enter due to an effect of an eddy current, it is found that effective relative permeability drops.

It is found that as the thickness is increased to 0.3 mm, 0.5 mm, and 0.9 mm, the relative permeability begins to drop in lower frequencies. Accordingly, a smaller thickness is advantageous for obtaining higher relative permeability in higher frequencies.

Accordingly, in the present embodiment, if the thickness of the first magnetic body 211 is 0.9 mm and the current flowing in the coil 321 is about 30 kHz, the relative permeability of the first magnetic body 211 is about 50 (no unit), according to FIG. 4. By performing relative permeability measurement depending on this thickness, it is possible to select a magnetic material of a plate member corresponding to the thickness to be used actually, as the first magnetic body 211 of low permeability.

Further, the relative permeability at 30 kHz of a nanocrystal soft magnetic material, which is the second magnetic body 212, is about 20000 (no unit). Other materials such as permalloy, electromagnetic steel, ferrite, and pure iron, having high relative permeability, generally take values shown in Table 1, although depending on the frequency.

TABLE 1

|  | Relative permeability |
|---|---|
| Nanocrystal soft magnetic material | 20000-200000 |
| Permalloy | 2500-70000 |
| Electromagnetic steel | 400-3200 |
| Ferrite | 400-3000 |
| Pure iron | 300-1000 |
| Magnetic stainless, Steel sheet | 150-500 |

Among these materials, ferromagnetic materials having higher relative permeability than that of the first magnetic body 211 can be used as the second magnetic body 212. Especially, one having relative permeability not less than 1000 (no unit) but less than 200000 which is the limit of industrial production can be preferably used as a material of the second magnetic body 212.

According to the present embodiment, the following action is made. That is, in order to rotate the lens driving motor 312, when an AC current of a driving frequency 30 kHz flows in the boosting coil 321, for example, a slight leakage magnetic field is generated in the space around the coil 321. The generated leakage magnetic field propagates the space while being attenuated.

As the magnetic field reaching near the image pickup element 203 is an alternate current, the direction is switched as constant vibration while being switched by the time period. From the viewpoint of a magnetic circuit, in FIGS. 2A and 2B, the magnetic field reaching near the image pickup element 203 is shunted to two types of paths, namely, a magnetic transmission path R1 reaching the image pickup element 203 shown by dotted-line arrows, and a magnetic transmission path R2 passing through the magnetic bodies 211 and 212 shown by solid-line arrows.

As a shunt ratio of the magnetic field varies according to the magnetic resistance of each of the paths R1 and R2, it is important to make the magnetic resistance of the magnetic transmission path R2, passing through the magnetic bodies 211 and 212, lower than the magnetic resistance of the magnetic transmission path R1 reaching the image pickup element 203. In the magnetic resistance of the entire magnetic transmission path R2 passing through the magnetic bodies 211 and 212, magnetic resistance of a region where the second magnetic body 212 is provided, in which the magnetic field should be transmitted by being bent in a horizontal direction, is dominant. By reducing the magnetic resistance of such a region by providing the second magnetic body 212 having high relative permeability in a long length in a horizontal direction, it is possible to reduce the magnetic resistance of the entire path R2 passing through the magnetic bodies 211 and 212.

In other words, even if magnetic resistance of another portion (for example, the frame portions on both right and left sides of the first magnetic body 211, the lower-side frame portion, or the inner peripheral surface on the image pickup element side of the upper-side frame portion) is reduced, while the magnetic resistance of the entire magnetic bodies 211 and 212 can be reduced a little, it cannot be reduced effectively.

In the present embodiment, by combining the first magnetic body 211 and the second magnetic body 212, it is possible to reduce the magnetic resistance of the entire path R2 passing through the magnetic bodies 211 and 212. Accordingly, the magnetic field shunted to the magnetic transmission path R2 is increased, whereby it is possible to reduce the magnetic field shunted to the magnetic transmission path R1 reaching the image pickup element 203. Consequently, it is possible to reduce the amount of a leakage magnetic field, generated from the boosting coil 321, reaching the image pickup element 203. As such, even if the semiconductor unit 231 of the image pickup element 203 performs operation to read an image signal, the influence by the magnetic field is less, image disturbance is less likely to be caused, and an original image signal is read.

The effect of suppressing image disturbance was tested in the digital single lens reflex camera 100 by capturing a dark image in a state of feeding an AC current to the coil 321 with no incident light. In the case of a dark image, as the entire image must show a certain level of luminance, deviation from the luminance value (deviation amount) is used here as an image disturbance amount. Assuming that an image disturbance amount without the first magnetic body 211 and the second magnetic body 212 is 100%, in the camera 100 of the present embodiment having the first magnetic body 211 and the second magnetic body 212, the image disturbance amount was reduced to about 72%.

Next, effects provided by the shape of the second magnetic body 212 will be described in detail based on examples.

EXAMPLE 1

In FIG. 2A illustrating a front view of the image pickup element 203, the image pickup element 203 having the semiconductor unit 231 of 25 mm laterally wide and 18 mm vertically wide was used. Around the image pickup element 203, the first magnetic body 211 (conductivity $\sigma=1\times0\ 10^7$ (S/m), relative permeability 50 (no unit)) was provided. The first magnetic body 211 had an opening H of 36 mm laterally wide and 25 mm vertically wide, and the frame shape thereof was 7 mm laterally wide and 0.9 mm thick. Away from the first magnetic body 211 by 0.1 mm, the second magnetic body 212 (conductivity $\sigma=\times11.0^7$ (S/m), relative permeability 10000 (no unit)) in a rectangle shape of 20 mm laterally wide, 7 mm vertically wide, and 18 μm thick was provided. The coil 321 generating a magnetic field was arranged from a position of 19.5 mm vertically upward of the center of the image pickup element 203 and 10 mm right horizontally, to a position of 50 mm in a front direction orthogonal to the sheet, such that the coil winding axis matched a direction orthogonal to the sheet.

It should be noted that at a position of 1.7 mm behind the image pickup element 203, a conductor, which was not a magnetic body, of 42 mm laterally wide, 38 mm vertically wide, and 0.07 mm thick was provided as a ground pattern in the printed wiring board 204. This conductor had conductivity $\sigma=\times5.70^7$ (S/M), and relative permeability 1.0 (no unit).

EXAMPLE 2

The second magnetic body 212 of 30 mm laterally wide, longer than the horizontal width 25 mm of the semiconductor unit 231 of the image pickup element 203, was provided. As the other aspects were the same as those of Example 1, the description is omitted.

EXAMPLE 3

The second magnetic body 212 of 50 mm laterally wide, longer than the horizontal width 36 mm of the opening H of the magnetic member 210, was provided. As such, the second magnetic body 212 was disposed along one side of the opening H of the magnetic member 210, and the length in a direction along one side was set to be longer than one side of the opening H. As the other aspects were the same as those of Example 1, the description is omitted.

EXAMPLE 4

The second magnetic body 212 of 1 mm vertically wide and 50 mm laterally wide was provided. As the other aspects were the same as those of Example 1, the description is omitted.

EXAMPLE 5

The second magnetic body 212 of 2 mm vertically wide and 50 mm laterally wide was provided. As the other aspects were the same as those of Example 1, the description is omitted.

EXAMPLE 6

The second magnetic body 212 of 3 mm vertically wide and 50 mm laterally wide was provided. As the other aspects were the same as those of Example 1, the description is omitted.

COMPARATIVE EXAMPLE 1

Only the first magnetic body 211 was provided, without the second magnetic body 212. As the other aspects were the same as those of Example 1, the description is omitted.

Regarding respective Examples 1 to 6 and Comparative Example 1, a magnetic field reaching the semiconductor unit 231 of the image pickup element 203 was obtained using commercial electromagnetic field simulation (ANSYS "Maxwell 3D"). The current applied to the coil 321 was a sine wave having a frequency of 30 kHz.

Figure 5:
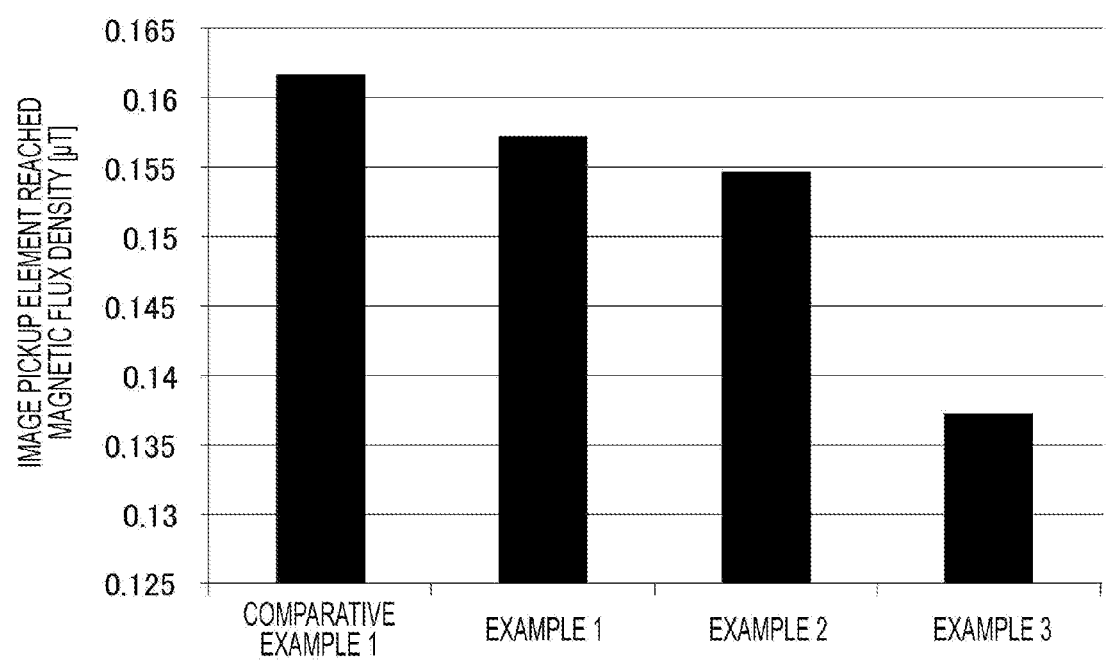
FIG. 5 is a graph illustrating results of obtaining a magnetic field reaching an image pickup element through electromagnetic field simulation.

FIG. 5 is a graph illustrating the results obtained from the electromagnetic field simulation of the magnetic field that reached the semiconductor unit 231 of the image pickup element 203 in Examples 1 to 3 and Comparative Example 1. As illustrated in FIG. 5, in Examples 1 to 3, the magnetic field reaching the semiconductor unit 231 of the image pickup element 203 was reduced, compared with Comparative Example 1. Especially, it was reduced largely in Example 3. This means that by providing the second magnetic body 212 of high relative permeability having a horizontal width longer than the length of the opening H of the magnetic member 210, the magnetic resistance in transmitting the magnetic field in a lateral width direction of the entire magnetic bodies 211 and 212 was reduced.

Figure 6:
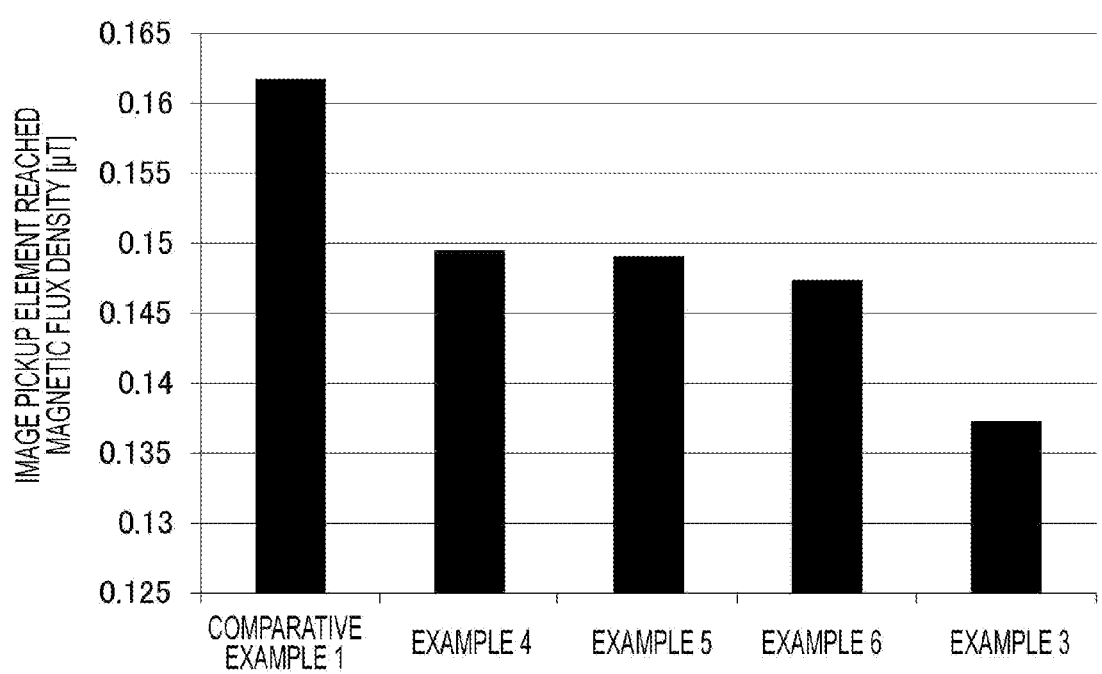
FIG. 6 is a graph illustrating results of obtaining a magnetic field reaching an image pickup element through electromagnetic field simulation.

FIG. 6 is a graph illustrating the results obtained from the electromagnetic field simulation of the reached magnetic field in Examples 3 to 6 and Comparative Example 1. As illustrated in FIG. 6, in Examples 3 to 6, the magnetic field that reached the semiconductor unit 231 of the image pickup element 203 was reduced, compared with the reached magnetic field of Comparative Example 1.

Especially, in Example 4, the reached magnetic field was reduced although the vertical width of the second magnetic body 212 having high relative permeability was 1 mm and the area was only 50 mm$^2$, compared with Example 1 having the area of 140 mm$^2$.

This means that by providing the second magnetic body 212 of high relative permeability having a lateral width longer than the length of the opening H of the magnetic member 210 even though the vertical width is narrow, the magnetic resistance in transmitting the magnetic field in a lateral width direction is effectively reduced. As such, in the case of further reducing the area of the second magnetic body 212 of high relative permeability, it is important to have a lateral width longer than the side length of the opening H of the magnetic member 210, even though the vertical width is narrow.

Further, while it is desirable that a separated distance between the first magnetic body 211 and the second magnetic body 212 is short, the results show that the magnetic field amount reaching the image pickup element 203 is almost the same if the distance is within a range from 0.1 mm to 3 mm.

Figure 7:
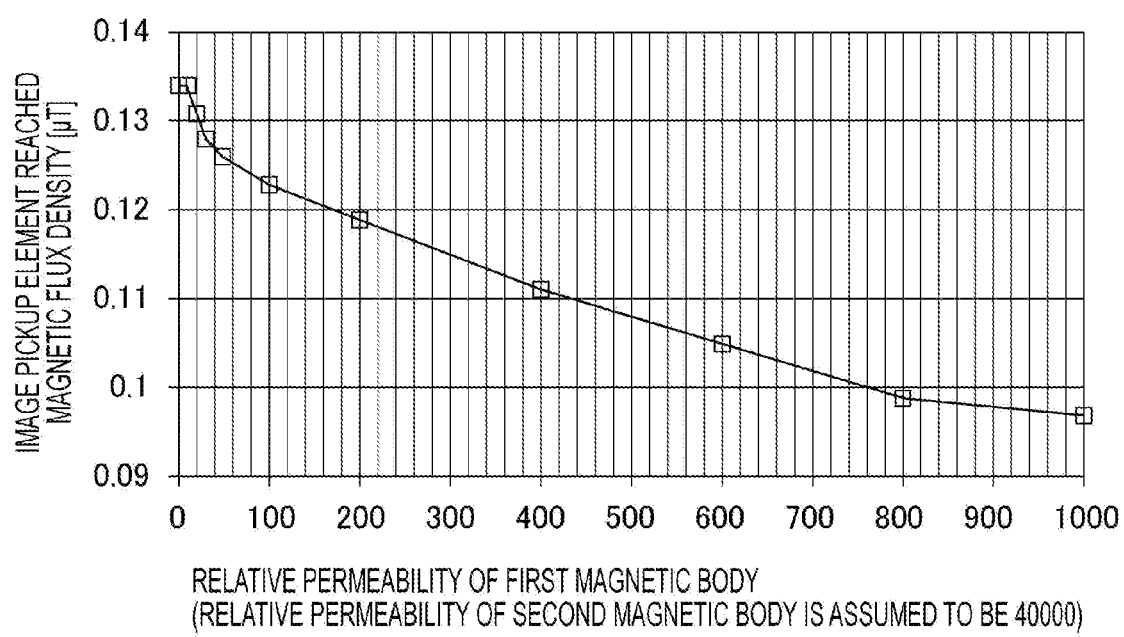
FIG. 7 is a graph illustrating results of obtaining a magnetic field reaching an image pickup element through electromagnetic field simulation.

Next, influence of the relative permeability of the first magnetic body 211 will be described. FIG. 7 is a graph illustrating the result obtained by the electromagnetic field simulation of the magnetic field that reached the image pickup element 203, while changing the relative permeability of the first magnetic body from 50 in Example 3. The second magnetic body 212 and the other conditions were the same as those of Example 3. However, only magnetic field in a vertical direction horizontal to a notably large sensor surface (light receiving surface 231a), in the magnetic field of the magnetic transmission path R1, was extracted. It should be noted that the relative permeability of the second magnetic body 212 was assumed to be 40000.

When the relative permeability of the first magnetic body 211 was 1 (the case of so-called non-magnetic body) and there was no second magnetic body, the reached magnetic field was 0.138 µT. Meanwhile, when the relative permeability of the first magnetic body 211 was 1 and there was the second magnetic body 212, the reached magnetic field was 0.135 µT, as illustrated in FIG. 7. As such, even with the second magnetic body 212, magnetic field bypassing effect was hardly obtained.

In the case were the relative permeability of the first magnetic body 211 became 50, magnetic field bypassing effect began to appear rapidly. With the relative permeability higher than that, the magnetic field that reached the image pickup element 203 was reduced as the relative permeability was increased.

Accordingly, as the first magnetic body 211, higher relative permeability is better. It is preferable that the relative permeability is 50 or higher. However, if the relative permeability is higher than 1000, a magnetic material is expensive. As such, it is preferable to use a material having relative permeability of lower than 1000 in practice.

Accordingly, the relative permeability of the first magnetic body 211 is preferably not less than 50 but less than 1000 in the driving frequency of the coil 321. Further, as described above, the relative permeability of the second magnetic body 212 is preferably not less than 1000 but less than 200000 in the driving frequency of the coil 321.

As described above, by using the first magnetic body 211 and the second magnetic body 212 having a smaller area and higher relative permeability than those of the first magnetic body 211, it is possible to reduce the magnetic field that reaches the image pickup element 203. As such, image disturbance caused by the image pickup element 203 can be suppressed. Further, as the area of the second magnetic body 212 having high relative permeability, which is expensive, can be reduced, it is possible to suppress image disturbance with an inexpensive configuration.

It should be noted that the present technology is not limited to the embodiment described above, and various changes can be made within the technical concept of the present technology. For example, even if the driving frequency of an electric current flowing in the coil, the arrangement, and the number are different, the present technology can be carried out by arranging the magnetic bodies corresponding to the case. Further, as for the first and second magnetic bodies, it is also possible to use materials other than those described in the embodiment by performing permeability measurement described herein.

Further, in the embodiment described above, description has been given on the case where the interchangeable lens 300 is configured to be detachable from the camera main body 200, the coil 321 is provided to the casing 301 of the interchangeable lens 300, and the first and second magnetic bodies 211 and 212 are provided to the casing 201 of the camera main body 200. However, the present technology is not limited to this configuration. The present technology is also applicable to an imaging device in which a lens is integrally installed in the imaging device main body. For example, the present technology is applicable not only to a digital single lens reflex camera but also a compact digital camera. In that case, a coil and first and second magnetic bodies are provided to the casing of the camera.

As such, according to the present embodiment, by using a first magnetic body and a second magnetic body having a smaller area and higher relative permeability than those of the first magnetic body, it is possible to reduce the magnetic field that reaches the image pickup element.

(Second Embodiment)

Figure 8A:
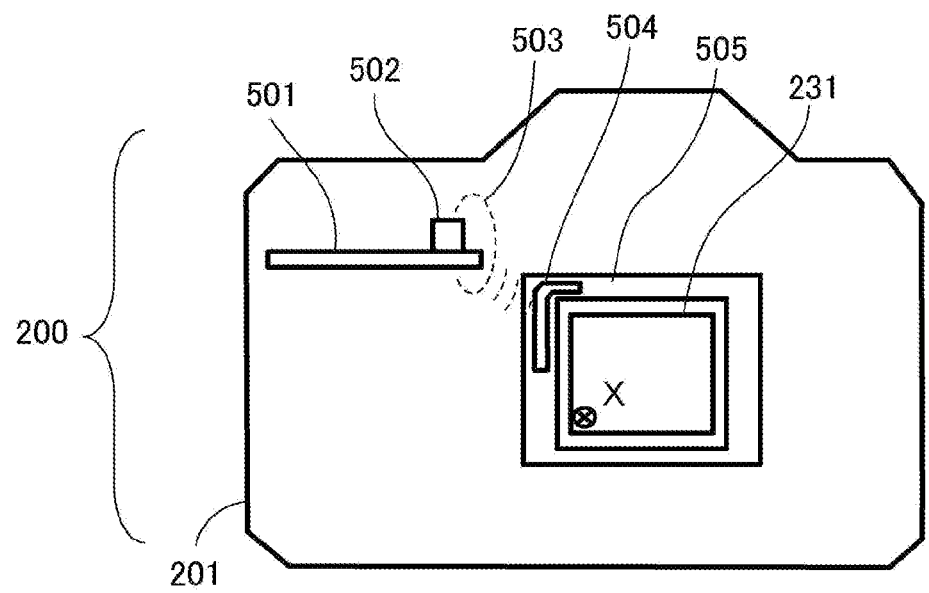
FIGS. 8A and 8B are diagrams illustrating a schematic configuration of an imaging device according to a second embodiment of the present technology.
Figure 8B:
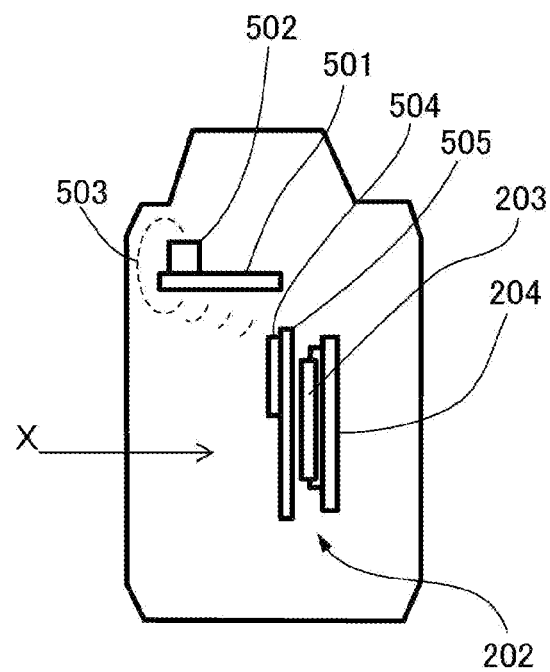

Next, a second embodiment of the present technology will be described with reference to FIGS. 8A and 8B. FIGS. 8A and 8B are diagrams illustrating a schematic configuration of a camera as an imaging device according to the second embodiment of the present technology. A coil 502, which is a magnetic field generation source of a power source conversion circuit 501 serving as a power source circuit, is disposed inside the casing 201 of the camera main body 200.

The imaging unit 202 includes a frame-like (annular) first magnetic body 505 having an opening H arranged between the coil 502 that is a magnetic field generation source and the image pickup element 203. The first magnetic body 505 is arranged adjacent to the image pickup element 203. More specifically, the first magnetic body 505 is arranged adjacent to the image pickup element 203 on the side where the coil 502 is disposed with respect to the image pickup element 203 in the arrow X direction, as illustrated in FIG. 8B.

The imaging unit 202 also includes a second magnetic body 504 arranged at a position of the coil 502 side with respect to the first magnetic body 505. The first magnetic body 505 has a surface on the side where the coil 502 is arranged in the arrow X direction, and the second magnetic body 504 is arranged adjacent to the surface. In that case, it is preferable that the second magnetic body 504 is arranged to have a slight gap with the first magnetic body 505 or is brought into contact with the first magnetic body 505. It is more preferable to bring the first magnetic body 505 and the second magnetic body 504 into contact with each other, because the magnetic resistance is reduced.

As illustrated in FIG. 8A, the second magnetic body 504 is arranged at a position of the coil 502 side with respect to the opening H when seen in the arrow X direction, while at least a portion thereof (the whole in the present embodiment) overlapping the first magnetic body 505. Specifically, the second magnetic body 504 is arranged adjacent to one side, nearest to the coil 502, of the four sides of the opening H. This means that the second magnetic body 504 is arranged on the frame portion of an opening side nearest to the coil 502, on the surface of the coil side of the first magnetic body 505.

The first magnetic body 505 and the second magnetic body 504 are made of a ferromagnetic material and formed in a plate shape or a film shape. The second magnetic body 504 is made of a ferromagnetic material having higher relative permeability than that of the first magnetic body 505. The second magnetic body 504 is formed to have a smaller area than that of the first magnetic body 505 when seen in the arrow X direction. Further, the second magnetic body 504 is formed to be thinner in the arrow X direction than the first magnetic body 505.

According to this configuration, most of the magnetic field 503, generated from the coil 502 that is a magnetic field generation source, passes through the second magnetic body 504 having low magnetic resistance, and subsequently passes through the first magnetic body 505. As such, the magnetic field reaching the image pickup element 203 can be reduced. The materials of the first magnetic body and the second magnetic body are selectable, which is the same as the case of the first embodiment.

In this way, by using the first magnetic body 505 and the second magnetic body 504 having a smaller area and higher relative permeability than those of the first magnetic body 505, it is possible to reduce the magnetic field reaching the image pickup element 203. As such, image disturbance caused by the image pickup element 203 can be suppressed. Further, as the area of the second magnetic body 504 having high relative permeability, which is expensive, can be reduced, it is possible to suppress image disturbance with an inexpensive configuration.

As in the present embodiment, the present technology is applicable even in the case where a magnetic field generation source is provided to the casing of the camera main body, and the camera main body corresponds to the imaging device.

(Third Embodiment)

Figure 9:
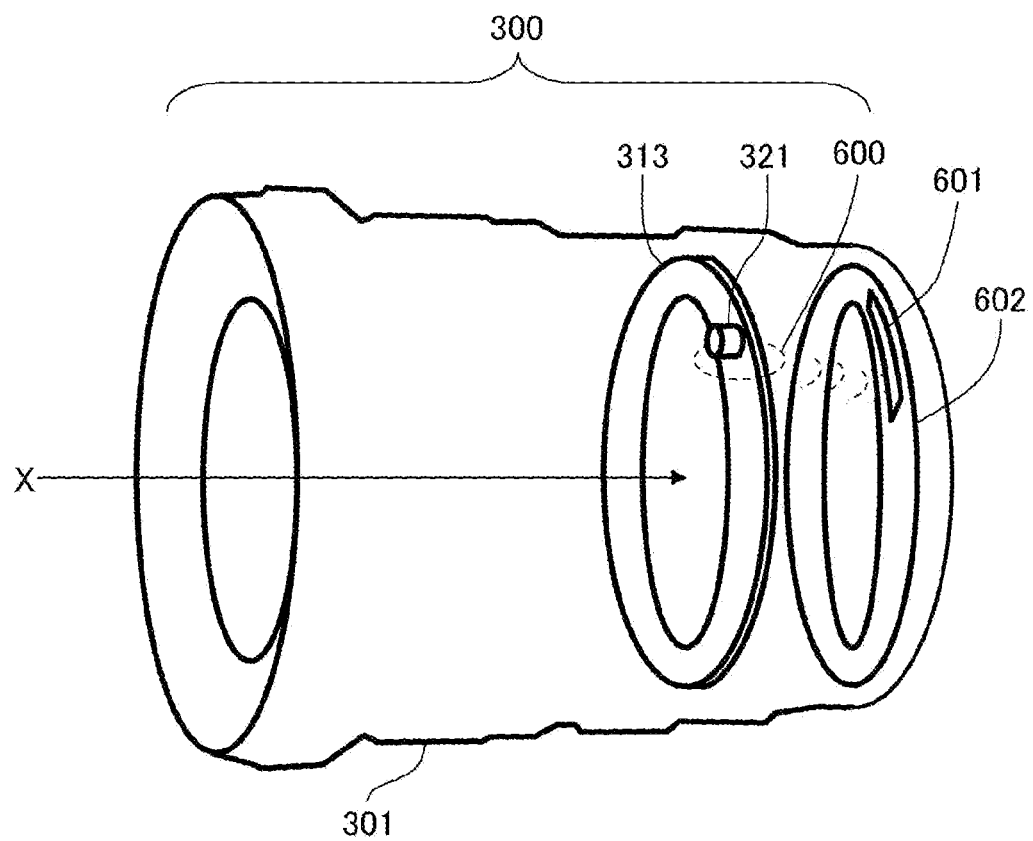
FIG. 9 is a diagram illustrating a schematic configuration of an interchangeable lens according to a third embodiment of the present technology.

Next, a third embodiment of the present technology will be described with reference to FIG. 9. FIG. 9 is a diagram illustrating a schematic configuration of an interchangeable lens according to the third embodiment of the present technology. In the third embodiment, the coil 321 that is a magnetic field generation source of the drive circuit 313 is disposed inside the casing 301 of the interchangeable lens 300. The interchangeable lens 300 (casing 301) is configured to be detachable from the imaging device main body (camera main body).

In FIG. 9, an annular first magnetic body 602 having an opening is arranged between the coil 321 that is a magnetic field generation source, and an image pickup element (not illustrated). Further, a second magnetic body 601 is arranged at a position on the coil 321 side with respect to the first magnetic body 602. The first magnetic body 602 has a surface on the side where the coil 321 is arranged in the arrow X direction, and the second magnetic body 601 is disposed adjacent to the surface. In that case, it is preferable that the second magnetic body 601 is arranged to have a slight gap with the first magnetic body 602 or is brought into contact with the first magnetic body 602. It is more preferable to bring the first magnetic body 602 and the second magnetic body 601 into contact with each other, because the magnetic resistance is reduced.

As illustrated in FIG. 9, the second magnetic body 601 is arranged at a position of the coil 321 side with respect to the opening when seen in the arrow X direction, while at least a portion thereof (the whole in the present embodiment) overlapping the first magnetic body 602. Specifically, the second magnetic body 601 is arranged on a frame portion adjacent nearest to the coil 321, of the sides of the opening.

The first magnetic body 602 and the second magnetic body 601 are made of a ferromagnetic material and formed in a plate shape or a film shape. The second magnetic body 601 is made of a ferromagnetic material having higher relative permeability than that of the first magnetic body 602. The second magnetic body 601 is formed to have a smaller area than that of the first magnetic body 602 when seen in the arrow X direction. Further, the second magnetic body 601 is formed to be thinner in the arrow X direction than the first magnetic body 602.

According to this configuration, most of the magnetic field 600, generated from the coil 321 that is the magnetic field generation source, passes through the second magnetic body 601 having low magnetic resistance, and subsequently passes through the first magnetic body 602. As such, the magnetic field reaching the image pickup element (not illustrated) can be reduced. The materials of the first magnetic body 602 and the second magnetic body 601 are selectable, which is the same as the case of the first embodiment.

In this way, by using the first magnetic body 602 and the second magnetic body 601 having a smaller area and higher relative permeability than those of the first magnetic body 602, it is possible to reduce the magnetic field reaching the image pickup element. As such, image disturbance caused by the image pickup element can be suppressed. Further, as the area of the second magnetic body 601 having high relative permeability, which is expensive, can be reduced, it is possible to suppress image disturbance with an inexpensive configuration.

As in the present embodiment, present technology is applicable even in the case where an interchangeable lens has first and second magnetic bodies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-109036, filed May 27, 2014, which is hereby incorporated by reference herein in its entirety.

What is claimed is:

1. An imaging device comprising:
an imaging optical system;
an image pickup element arranged opposite to the imaging optical system, the image pickup element being configured to perform photoelectric conversion on an optical image formed by the imaging optical system;
a magnetic field generation source that generates a magnetic field when receiving an electric current supplied; and
an annular magnetic member arranged between the magnetic field generation source and the image pickup element, the annular magnetic member having an opening through which light directed from the imaging optical system toward the image pickup element passes,
wherein
the annular magnetic member includes a first magnetic body and a second magnetic body, the second magnetic body being made of a ferromagnetic material having higher relative permeability than relative permeability of the first magnetic body, the second magnetic body having a smaller area than an area of the first magnetic body when seen in an optical axis direction of the imaging optical system, and
a region in which the second magnetic body is arranged includes a region nearest to the magnetic field generation source of the annular magnetic member.

2. The imaging device according to claim 1, wherein
the first magnetic body is an annular member, and the second magnetic body is arranged in contact with a surface of a side opposite to the magnetic field generation source of the first magnetic body.

3. The imaging device according to claim 2, wherein
the first magnetic body is arranged adjacent to the image pickup element.

4. The imaging device according to claim 2, wherein
the relative permeability of the first magnetic body is not less than 50 but less than 1000 in a driving frequency of the magnetic field generation source, and the relative permeability of the second magnetic body is not less than 1000 but less than 200000 in the driving frequency of the magnetic field generation source.

5. The imaging device according to claim 2, wherein
the first magnetic body includes at least one of SUS430 steel, SUS630 steel, and cold rolled Steel (SPCC Steel), and the second magnetic body includes at least one of nanocrystal soft magnetic material, permalloy, amorphous magnetic material, ferrite, and electromagnetic steel.

6. The imaging device according to claim 1, wherein
the annular magnetic member is a quadrangle annular member, and the region in which the second magnetic body is arranged is arranged along a region constituting one side, nearest to the magnetic field generation source, of the annular magnetic member.

7. The imaging device according to claim 6, wherein
a length along the region constituting the one side of the second magnetic body of the annular magnetic member is longer than a length along the region constituting the one side of the opening.

8. The imaging device according to claim 2, wherein
the magnetic field generation source is a drive circuit that drives the imaging optical system, a power supply circuit, or a coil included in a motor.

9. An imaging device comprising:
a casing to and from which an interchangeable lens is attachable and detachable, the interchangeable lens including an imaging optical system and a magnetic field generation source that generates a magnetic field when receiving an electric current supplied;
an image pickup element to be arranged inside the casing at a position opposite to the imaging optical system when the interchangeable lens is attached to the casing, the image pickup element being configured to perform photoelectric conversion on an optical image formed by the imaging optical system; and
an annular magnetic member to be arranged inside the casing at a position between the magnetic field generation source and the image pickup element when the interchangeable lens is attached to the casing, the annular magnetic member having an opening through which light directed from the imaging optical system toward the image pickup element passes, wherein the annular magnetic member includes a first magnetic body and a second magnetic body, the second magnetic body being made of a ferromagnetic material having higher relative permeability than relative permeability of the first magnetic body, the second magnetic body having a smaller area than an area of the first magnetic body when seen in an optical axis direction of the imaging optical system, and a region in which the second magnetic body is arranged includes a region nearest to the magnetic field generation source of the annular magnetic member.

10. An imaging device comprising:

a casing to and from which an interchangeable lens, including an imaging optical system, is attachable and detachable;

an image pickup element to be arranged inside the casing at a position opposite to the imaging optical system when the interchangeable lens is attached to the casing, the image pickup element being configured to perform photoelectric conversion on an optical image formed by the imaging optical system;

a magnetic field generation source provided to the casing, the magnetic field generation source generating a magnetic field when receiving an electric current supplied; and an annular magnetic member arranged between the magnetic field generation source and the image pickup element, the annular magnetic member having an opening through which light directed from the imaging optical system toward the image pickup element passes, wherein the annular magnetic member includes a first magnetic body and a second magnetic body, the second magnetic body being made of a ferromagnetic material having higher relative permeability than relative permeability of the first magnetic body, the second magnetic body having a smaller area than an area of the first magnetic body when seen in an optical axis direction of the imaging optical system, and a region in which the second magnetic body is arranged includes a region nearest to the magnetic field generation source of the annular magnetic member.

11. An interchangeable lens comprising:

an interchangeable lens casing attachable to and detachable from an imaging device main body including an image pickup element;

an imaging optical system arranged inside the interchangeable lens casing, the imaging optical system being configured to allow the image pickup element to form an optical image when attached to the imaging device main body;

a magnetic field generation source arranged inside the interchangeable lens casing, the magnetic field generation source generating a magnetic field when receiving an electric current supplied; and an annular magnetic member to be arranged inside the interchangeable lens casing at a position between the magnetic field generation source and the image pickup element when the interchangeable lens is attached to the imaging device main body, the annular magnetic member having an opening through which light directed from the imaging optical system toward the image pickup element passes, wherein the annular magnetic member includes a first magnetic body and a second magnetic body, the second magnetic body being made of a ferromagnetic material having higher relative permeability than relative permeability of the first magnetic body, the second magnetic body having a smaller area than an area of the first magnetic body when seen in an optical axis direction of the imaging optical system, and a region in which the second magnetic body is arranged includes a region nearest to the magnetic field generation source of the annular magnetic member.

* * * * *